US006009064A

United States Patent [19]
Hajjar

[11] Patent Number: 6,009,064
[45] Date of Patent: Dec. 28, 1999

[54] OPTICAL HEAD HAVING DIELECTRIC TRANSITION LAYER IN NEAR-FIELD OPTICAL STORAGE SYSTEM

[75] Inventor: Roger Hajjar, Santa Clara, Calif.

[73] Assignee: Terastor Corporation, San Jose, Calif.

[21] Appl. No.: 08/965,031

[22] Filed: Nov. 5, 1997

[51] Int. Cl.$^6$ .................................................... G11B 7/00
[52] U.S. Cl. ............................................................ 369/112
[58] Field of Search ..................................... 369/13, 44.23, 369/58, 112; 359/654, 664, 793–795, 813–814, 823–824

[56] References Cited

U.S. PATENT DOCUMENTS

| | | |
|---|---|---|
| 1,455,504 | 5/1923 | Odem . |
| 3,609,721 | 9/1971 | Meneley . |
| 3,897,069 | 7/1975 | Lee . |
| 4,101,948 | 7/1978 | Tadokoro et al. ....................... 360/137 |
| 4,519,059 | 5/1985 | Denis . |
| 4,622,618 | 11/1986 | Oishi et al. .............................. 360/133 |
| 4,633,450 | 12/1986 | Gueugnon . |
| 4,661,874 | 4/1987 | Buehl et al. ............................. 360/128 |
| 4,753,521 | 6/1988 | Deserno . |
| 4,794,586 | 12/1988 | Korth ....................................... 369/215 |
| 4,965,780 | 10/1990 | Lee et al. .................................. 369/13 |
| 4,987,292 | 1/1991 | Howard ................................. 250/201.5 |
| 5,004,307 | 4/1991 | Kino et al. . |
| 5,020,040 | 5/1991 | Lee ............................................ 369/13 |
| 5,105,408 | 4/1992 | Lee et al. .............................. 369/44.15 |
| 5,112,662 | 5/1992 | Ng . |
| 5,115,363 | 5/1992 | Khan et al. .............................. 360/104 |

(List continued on next page.)

FOREIGN PATENT DOCUMENTS

| | | |
|---|---|---|
| 62-31080 | 2/1987 | Japan . |
| 62-204421 | 9/1987 | Japan . |

OTHER PUBLICATIONS

Hayashi, S., et al., "Solid Immersion Lens for Optical Storage," Stanford University, G.L. Report No. 5258, Feb. 1995 (9 page document).

Ichimura, Isao, et al., "High Density Optical Recording Using a Solid Immersion Lens," Stanford University, G.L. Report No. 5371, Nov. 1995, pp. 1–22 and Figs. 1–17.

Mamin, H.J., et al., "High density optical recording with a flying solid immersion lens," presented at the Optical Data Storage Conference in San Diego, California in May, 1995, pp. 1–2.

Terris, B.D., et al., "Near–field optical data storage using a solid immersion lens," *Applied Physics Letter,* 65 (4), Jul. 25, 1994, pp. 388–390.

Rubin, Kurt A., et al., "Volumetric Magneto–Optic Storage on Multiple Recording Surfaces", Jul. 8–12, 1996, *Technical Digest,* 1996, vol. 12.

Maeda, Fumisada, et al., "High Density Optical Disk System Using a New Two–Element Lens and a Thin Substrate Disk", Research Center, Sony Corporation, pp. 342–344.

Rubin, Kurt A., et al., "Multilevel Volumetric Optical Storage", SPIE vol. 2338 *Optical Data Storage* 1994, pp. 247–253.

Yamamoto et al., A 0.8 Numerical Aperture Two element Objective Lens for the Optical Dis, OFA2–1:345–347.

Kino et al., High Density Storage with a Solid Immersion Lens, Invited Paper Stanford University.

(List continued on next page.)

*Primary Examiner*—W. R. Young
*Attorney, Agent, or Firm*—Fish & Richardson P.C.

[57] ABSTRACT

An electro-optical storage system based on an air-bearing-suspended optical head and operated in a near-field configuration. The system comprises a read/write head and a head positioning system, an optics module including beam relay optics and signal detectors, an optical medium and a corresponding medium driving unit, and an electronic control system. The optical head includes a near-field lens positioned over the optical medium by a fraction of the wavelength. A transition dielectric layer is formed on the near-field lens to improve the optical and mechanical coupling between the head and the optical medium.

36 Claims, 9 Drawing Sheets

U.S. PATENT DOCUMENTS

| | | |
|---|---|---|
| 5,120,603 | 6/1992 | Schmidt . |
| 5,121,256 | 6/1992 | Corle et al. . |
| 5,125,750 | 6/1992 | Corle et al. ............... 359/819 |
| 5,128,216 | 7/1992 | Ng . |
| 5,136,448 | 8/1992 | Kiriyama et al. ............ 360/128 |
| 5,153,870 | 10/1992 | Lee et al. ................... 369/111 |
| 5,161,134 | 11/1992 | Lee ............................. 369/13 |
| 5,182,444 | 1/1993 | Howard . |
| 5,191,563 | 3/1993 | Lee et al. .................... 369/13 |
| 5,197,050 | 3/1993 | Murakami et al. . |
| 5,202,880 | 4/1993 | Lee et al. ............... 369/275.4 |
| 5,223,710 | 6/1993 | Pavlak . |
| 5,225,926 | 7/1993 | Cuomo et al. . |
| 5,228,022 | 7/1993 | Compton et al. . |
| 5,232,570 | 8/1993 | Haines et al. . |
| 5,243,241 | 9/1993 | Wang . |
| 5,247,510 | 9/1993 | Lee et al. ................... 369/118 |
| 5,255,260 | 10/1993 | Yamada et al. . |
| 5,260,928 | 11/1993 | Lee et al. ................... 369/112 |
| 5,288,997 | 2/1994 | Betzig et al. . |
| 5,295,122 | 3/1994 | Murakami et al. . |
| 5,307,336 | 4/1994 | Lee et al. ................... 369/112 |
| 5,381,402 | 1/1995 | Lee et al. ................... 369/291 |
| 5,397,644 | 3/1995 | Yamashita . |
| 5,432,763 | 7/1995 | Campbell et al. . |
| 5,445,011 | 8/1995 | Ghislain et al. . |
| 5,450,379 | 9/1995 | Fujimori et al. .......... 369/275.1 |
| 5,452,283 | 9/1995 | Lee et al. ................... 369/112 |
| 5,467,238 | 11/1995 | Lee et al. . |
| 5,470,627 | 11/1995 | Lee et al. . |
| 5,486,970 | 1/1996 | Lee et al. . |
| 5,497,359 | 3/1996 | Mamin et al. ............ 369/44.15 |
| 5,504,731 | 4/1996 | Lee et al. ................... 369/112 |
| 5,510,186 | 4/1996 | Sulzbach . |
| 5,541,888 | 7/1996 | Russell ....................... 369/112 |
| 5,602,819 | 2/1997 | Inagaki et al. ............. 369/112 |
| 5,602,820 | 2/1997 | Wickramasinghe et al. ........... 369/126 |
| 5,609,948 | 3/1997 | David et al. . |
| 5,631,893 | 5/1997 | Kang et al. .............. 369/44.15 |
| 5,729,393 | 3/1998 | Lee et al. . |
| 5,828,453 | 10/1998 | Yamamoto et al. . |
| 5,828,482 | 10/1998 | Jain . |
| 5,828,644 | 10/1998 | Gage et al. . |

OTHER PUBLICATIONS

Mansfield et al., Solid Imersiom Microscope, Appl. Phys. Lett. 57(24):16215 (Dec. 10, 1990).

Mansfield et al., High–Numerical–aperture lens system for optical storage, Optic Letters vol. 18(4):365–367 (Aug. 28, 1992).

Betzig et al., Near–field magneto–optics and High Density Data Storage, Appl. Phys. Lett. 61(2):142–144.

OPTICAL HEAD HAVING DIELECTRIC TRANSITION LAYER IN NEAR-FIELD OPTICAL STORAGE SYSTEM

FIELD OF THE INVENTION

The present invention generally relates to optical storage and data retrieval, and more particularly to techniques and electro-optical systems for data storage and retrieval in a near-field recording configuration.

BACKGROUND OF THE INVENTION

Optical storage can be used to achieve high areal density data storage, i.e., amount of data per unit recording area. The areal density of an optical storage device, in principle, is only limited by the diffraction limit of an illuminating optical beam for reading or writing. Electro-optical data storage systems based on magneto-optical materials may be configured to produce areal data densities of up to or greater than about one gigabit (i.e., $10^9$ bits) per square inch.

One approach to increase the areal data density in an optical storage system is to use a reduced beam size to write or read in a small spot. A monochromatic optical beam has a theoretical diffraction limit on the minimum beam size which is approximately on the order of its wavelength. Light sources with short wavelengths, such as those toward the blue end of the optical spectrum, may be used to further decrease the beam size and thereby achieve an even higher areal density.

Alternatively, the numerical aperture of the objective lens can be increased to focus a beam of a given wavelength to a reduced small spot within the diffraction limit. The reduced beam spot increases the areal density.

SUMMARY OF THE INVENTION

The present disclosure describes an electro-optical storage system which includes a read/write head, a head positioning system, an optics module with beam relay optics and signal detectors, an optical medium, and an electronic control system. The read/write head is spaced from an active recording layer in the medium by a fraction of the wavelength to form a near-field configuration. The areal data density, therefore, can be increased by focusing a read/write beam to a dimension smaller than the minimum beam size dictated by the diffraction limit.

The read/write head is preferably a "flying" head which is suspended over the optical medium by an air-bearing surface. An optical read/write beam exiting the near-field lens is then coupled to the optical medium by evanescent waves. The flying head includes a near-field lens with a high index of refraction and usually has a numerical aperture which may be greater than unity.

One aspect of the invention is the automatic optimization and maintenance of focus under the preferred near-field condition. This is accomplished, at least in part, by the use of the air-bearing surface which causes the head to fly over the surface of the optical medium by a fraction of a wavelength.

The optics module is preferably a fixed optics module. This means that the relative positions of different optical elements within the module are fixed relative to one another. In one embodiment, the fixed optics module includes a light source, a data/servo detector, and beam control optics that guide a read/write beam to and from the flying head. The beam control optics may include a galvo mirror or a galvo-controlled prism or transparent plate to provide a fine positioning means operating to guide the read/write beam.

An actuator that is in either a rotary or linear configuration may be used as a coarse positioning control for the optical disk drive. Other positioning devices may also be used. The fixed optics module and the flying head are attached to an actuator arm. Hence, a data sector on the optical medium may be addressed with a read/write beam by adjusting the actuator and/or turning the galvo mirror.

The optical medium may be preferably structured to form a first surface recording configuration in which one or more active recording layers are formed on or near the top surface of the medium and spaced from the bottom of the flying head by a distance less than a wavelength. A thin dielectric layer may be formed on the top of the medium to improve the mechanical and optical interface between the flying head and the medium and to reduce the required optical power for writing data in the medium.

A transition dielectric layer is preferably formed on the bottom surface of the flying head to further improve the opto-mechanical coupling between the flying head and the medium and to improve the signal stability of the system. The transition dielectric layer reduces the hardness of the bottom surface of the flying head and reduces the friction between the flying head and the medium. The index of refraction of the transition dielectric layer is preferably less than that of the near-field lens but larger than that of the air. In particular, a diamondlike carbon material ("DLC") may be used as the transition dielectric layer.

These and other aspects and advantages of the present invention will become more apparent in light of the following detailed description, the accompanying drawings, and the appended claims.

DETAILED DESCRIPTION OF THE INVENTION

Figure 1:
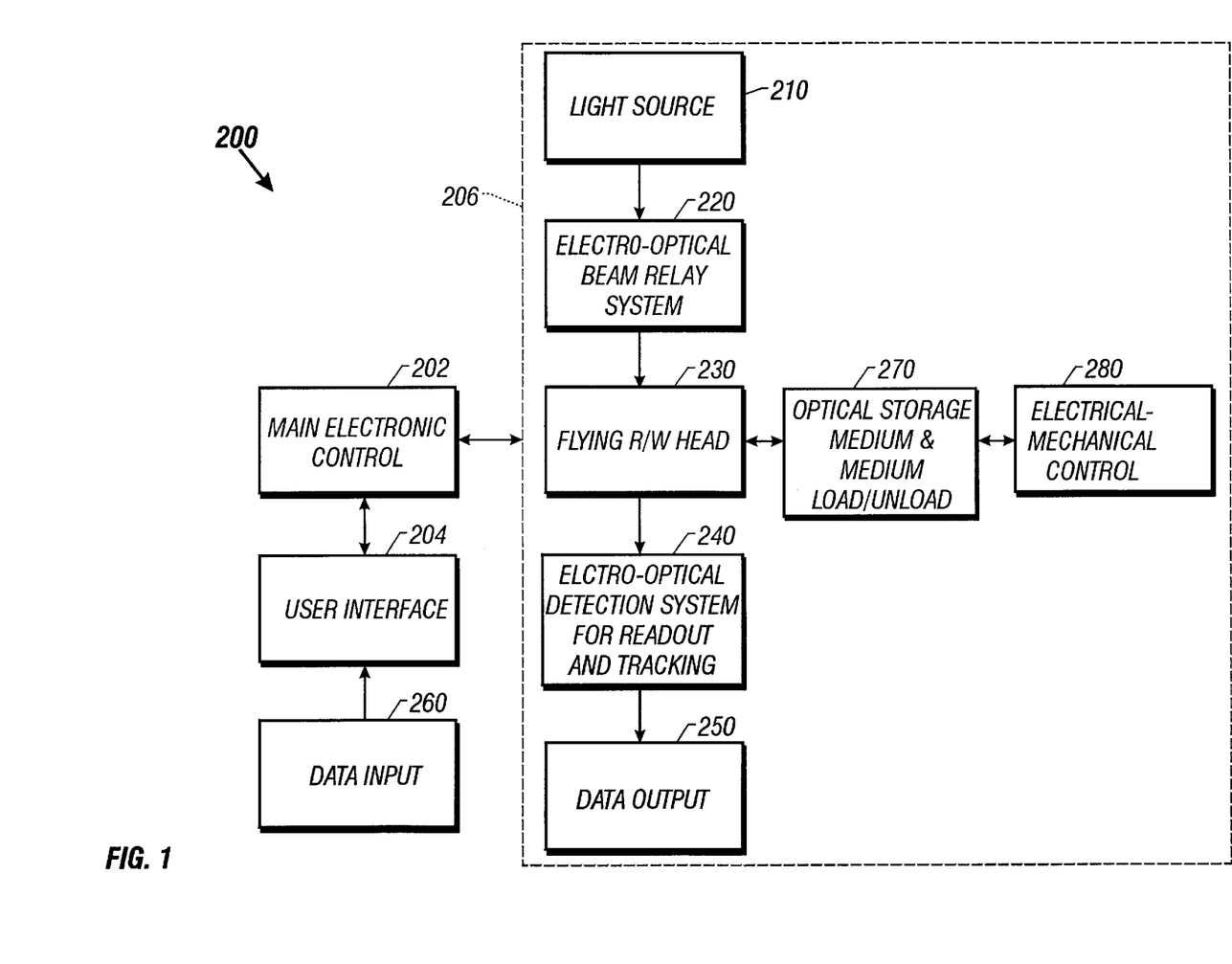
FIG. 1 is a block diagram showing a preferred optical rewritable storage system of the invention.

A block diagram of an embodiment 200 is shown in FIG. 1. Arrow lines indicate a communication signal by either optical or electrical carriers or both.

An optical storage medium 270 in the form of a disk or other format can be of a read-only type, a write-once-read-many type, or a write-many-read-many type. Data is spatially distributed and stored in the medium 270 through a predetermined encoding method. The medium 270 can be removable with a cartridge-type of protective housing and a load/unload system. Alternatively, the medium 270 can be configured as a fixed medium such as a hard disk drive. A light source 210 produces a light beam at a wavelength to which the optical medium 270 is responsive. A beam relay system 220 shapes the beam in a desired spatial profile and delivers the beam with the desired propagation characteristics to a flying read/write head 230. The flying head 230 further shapes and focuses the beam generated by the light source 210 onto the optical medium 270 to read and/or write data thereon.

Preferably, the flying head 230 and the optical medium 270 are positioned relative to each other so that the optical spacing therebetween is less than one wavelength of the light produced by light source 210. This is known as the "near-field" configuration. In particular, the optical spacing can be less than one half of the wavelength (e.g., about one-sixth of the wavelength). An air-bearing surface may be implemented at the base of the flying head 230 to maintain a desired focus without conventional servo optics for focusing.

For a given wavelength, the focused beam size can be reduced by increasing the numerical aperture ("NA") of a focusing optical element (e.g., an objective lens assembly). In the present invention, one approach achieves a large numerical aperture in the flying head by combining a near-field lens with an objective lens. The near-field lens is preferably made of a high-index optical material so as to have a large effective NA. For example, a solid immersion lens ("SIL"), a graded index lens ("GRIN lens") or a "Gradium lens" may be used as the near field lens. High index and optically transparent materials suitable for the near-field lens include, but are not limited to, cubic Zirconia, Schott glass LaSF35, Hoya glass TaFd43, Cleartran, Zinc Selenide, Gallium Phosphide.

In the above near-field configuration, light is coupled by evanescent waves rather than by light propagation between the exit surface of the flying head and the optical medium via a thin layer of air gap. This near-field interaction can cause a unique behavior in a reflected optical wave from the optical medium. Thus, the near-field configuration affects the signal detection and data retrieval.

Alternatively, a non-near-field configuration can also be used with the flying head 230, in which case the separation between the flying head and the recording layer may allow less efficient coupling of evanescent waves. In this case, a conventional servo focusing system is needed to directly focus the beam onto the recording surface.

The relative position and motion of the flying head 230 and the optical medium 270 are determined and controlled by both the position and movement of the flying head 230 and that of the optical medium 270. In particular, an electrical-mechanical control 280 is used to control the position and motion of the optical medium 270. For example, a motorized spindle system can be included in the electrical-mechanical control 280 if the optical medium 270 is in a disk format.

The light beam incident on the optical medium 270 is reflected. In a recording operation, the reflected beam from the optical medium 270 is encoded with beam-tracking information. In a readout operation, the reflected beam usually is modulated with both tracking information and the data stored on the optical medium 270. The reflected beam from the optical medium 270 is received by the flying head 230 and routed to a detection system 240 that includes photodetectors for both data extraction and beam tracking.

Recording data onto the optical medium 270 can be done by either modulating a writing beam via an optical modulation of beam intensity, phase, or polarization (either at the light source 210 or at the beam relay system 220), or by directly modulating the state of the optical medium 270 through thermal or electromagnetic methods.

A main electronic control 202 can be implemented to monitor and control all components and subsystems. A user interface 204 may include, but is not limited to, a computer keyboard, a display, electrical and mechanical switches and control buttons.

These system components and the operation thereof are described in U.S. patent application Ser. No. 08/846,916, "Electro-optical storage system with flying head for near-field recording and reading", filed on Apr. 29, 1997, the entire disclosure of which is incorporated herein by reference as part of the present specification.

Figure 2:
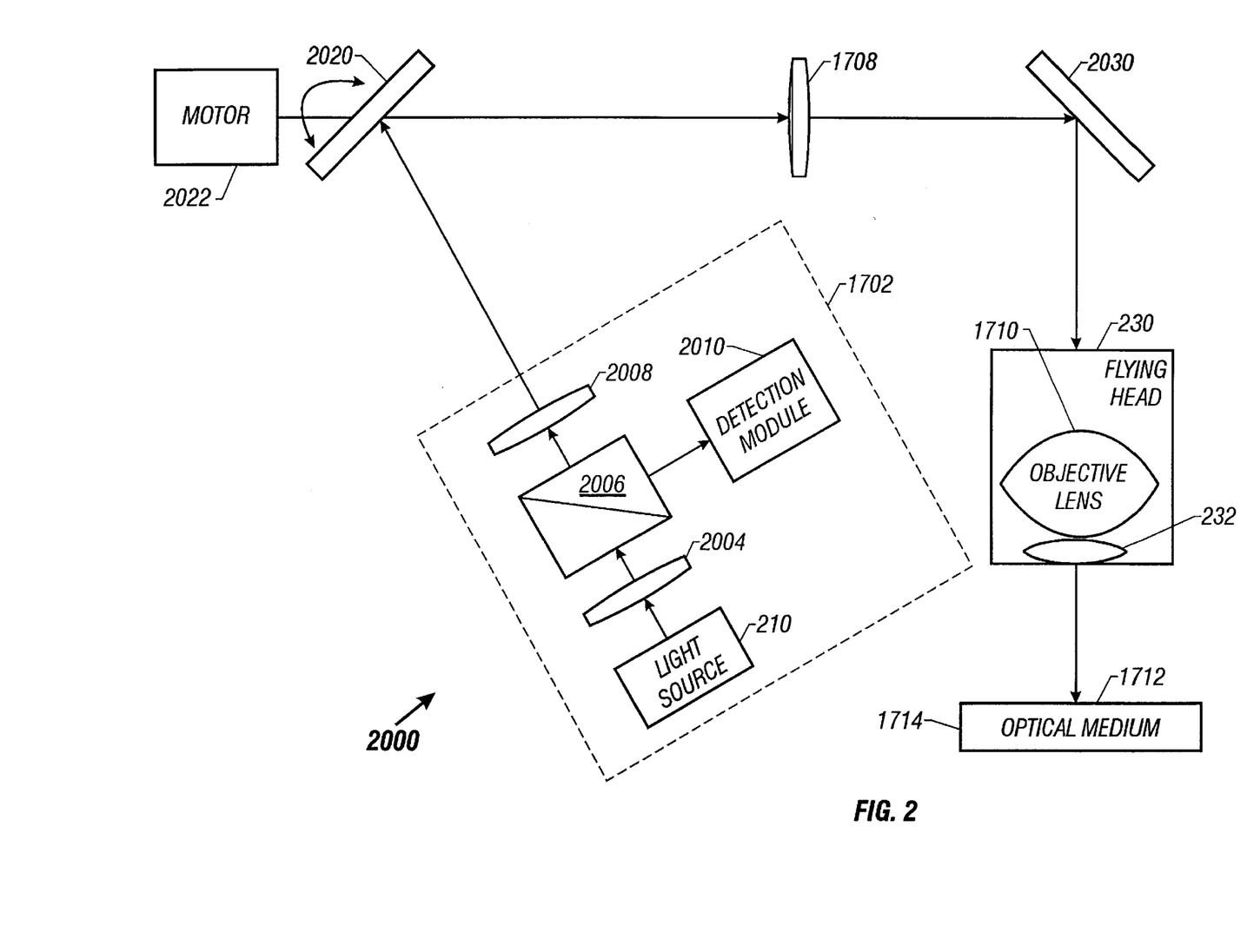
FIG. 2 is a schematic illustration showing an embodiment of the optical train using a galvanometer reflector for positioning the read/write beam on an optical medium.

In a practical implementation of the system of FIG. 1, a positioning mechanism is employed to guide the read/write beam to a desired location on the optical medium. FIG. 2 shows one exemplary optical train 2000 linking a fixed optical module 1702 ("FOM") to an optical medium 1714.

A light source (e.g., a laser) 210 emits a light beam that is corrected and collimated by a first optical element 2004 and a second optical element 2008. Reflectors 2020 and 2030 and an imaging lens 1708 direct the collimated beam to an objective lens 1710. The beam is then focused onto a surface 1712 of the optical medium 1714 by a near-field lens 232 in the flying head 230. The reflected beam from the optical medium 1714 is then received by the near-field lens 232 and the objective lens 1710 and is sent back to the optical module 1702. A beamsplitter 2006 guides a portion of the reflected beam to a detection module 2010 having detectors for both data extraction and beam tracking.

A near-field recording/reading configuration with a flying head is used to achieve automatic focusing. The beam tracking is done by a servo system using tracking error signals produced by the tracking flags or grooves in the optical medium 1714. A galvanometer motor 2022 can be used to control either reflectors 2020 or 2030 for beam tracking. FIG. 2 shows the galvanometer 2022 connected to the first reflector 2020 for beam tracking. Alternatively or in combination therewith, the reflector 2030 can be connected to a galvanometer and adjusted for beam tracking.

Coarse beam guiding and tracking may be accomplished by implementing an actuator. Several types of actuators can be used in accordance with the present invention to position the flying head over the optical medium at a selected location, two of which are described here: a rotary actuator and a linear actuator.

Figure 3:
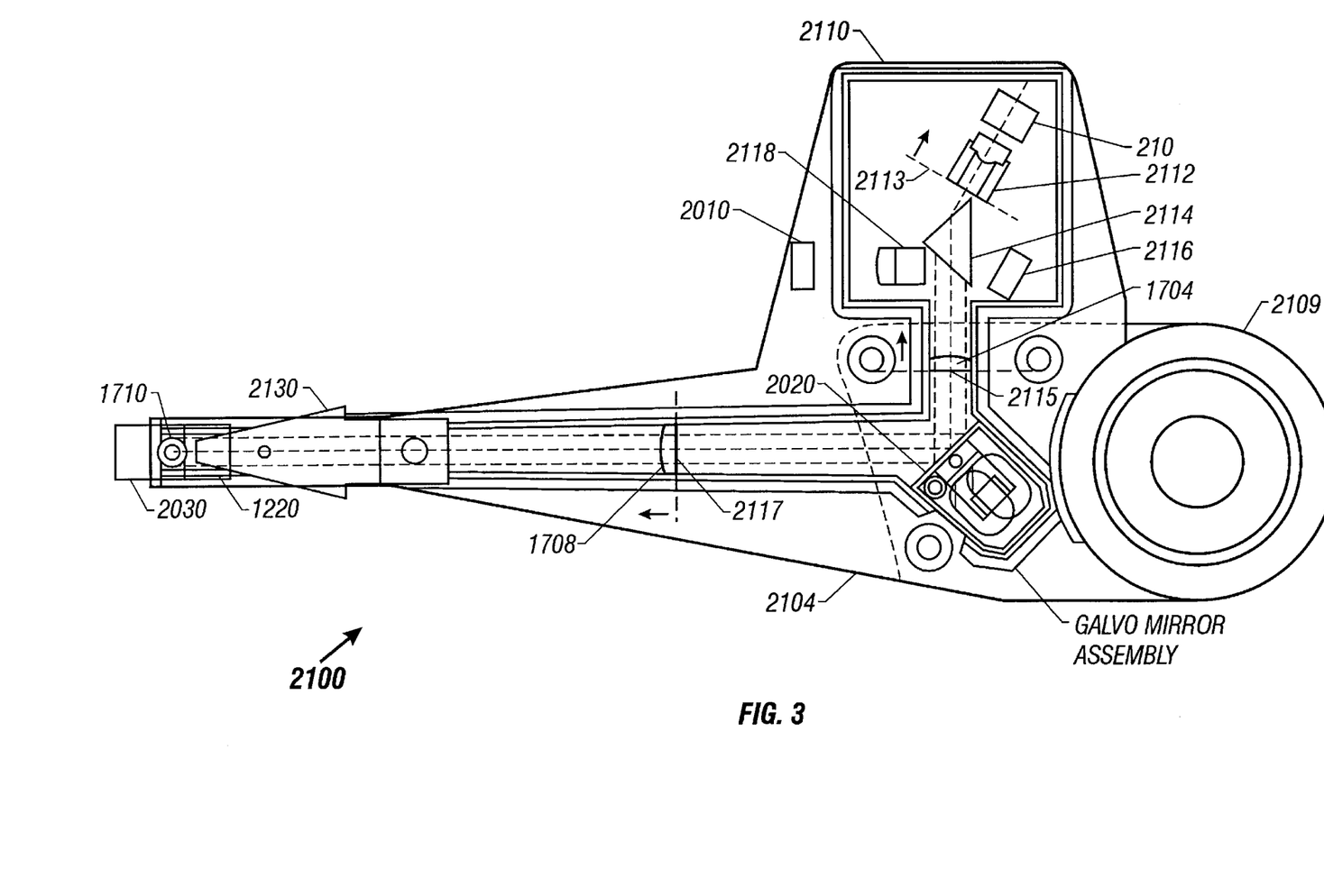
FIG. 3 is a schematic illustration showing a rotary actuator holding a fixed optics module and a flying head with a galvo mirror for fine positioning.

FIG. 3 shows a rotary actuator system 2100 with a fixed optics module based on the optical train of FIG. 2. A rotary actuator includes a hub 2109 and a rotary actuator arm 2104 which is substantially parallel to the surface 1712 of the optical medium and is pivotally mounted to a drive base plate (not shown). The rotary actuator has a coil positioned to interact with a permanent magnet (not shown) that is fixed to the drive base plate (also not shown) for controlling movement of the arm 2104. The actuator arm 2104 laterally extends from the side of the hub 2109 to cantilever the optical head, including the objective lens 1710 and the near-field lens 232 (shown in FIG. 2) integrated in the slider 2120, over the surface of the optical medium. The actuator arm 2104 provides a coarse positioning mechanism for moving the optical head to a desired point above the optical medium.

The system 2100 may have additional optical elements. An optics module 2110 is mounted on a portion of the actuator arm 2104. The optics module 2110 may include the light source 210, a collimator lens 2112, an anamorphic prism 2114, a front facet monitor 2116, a polarization rotator 2118, and the data and servo detector 2010. A light beam generated by the light source 210 is collimated by the collimator lens 2112 and the anamorphic prism 2114 and is guided by the galvo mirror 2020 in a galvo mirror assembly and the folding mirror 2030 to the objective lens 1710. A relay lens 1704 is disposed between the collimator lens 2112 and the galvo mirror 2020 to project the collimated beam from the collimator lens 2110 to the reflective surface of the galvo mirror 2020. An imaging lens 1708, located between the galvo mirror 2020 and the objective lens 1710, produces an image of the reflective surface of the galvo mirror 2020 at a prespecified location near the objective lens 1710. The galvo mirror 2020 is controlled to provide a fine positioning mechanism for precisely positioning the read/write beam on a desired point on the optical medium.

All the optical elements in the optical train, including the optics module 2110, the relay lens 1704, the galvo mirror 2020, the imaging lens 1708, and the folding mirror 2030 are secured to the rotary actuator arm 2104 and have a fixed spatial relation with one another. Thus, the above optical elements form a fixed optics module. The optical train further includes the flying head which has the objective lens 1710 and a near-field lens integrated with a slider 2120. The slider 2120 is positioned to float over the surface 1712 via a resilient flexure 2130. As described previously, the slider 2120 has a SIL or a GRIN lens located between the objective lens 1710 and the optical medium.

Therefore, the elements in the optical train have a predetermined spatial relationship with one another regardless of the position of the actuator arm 2104. As the arm 2104 rotates, all the optical elements of the optical train rotate accordingly. The coarse positioning of the flying head relative to the optical medium is done by rotating the actuator arm 2104; fine beam tracking is done by adjusting the beam with the galvo mirror 2020.

Figure 4A:
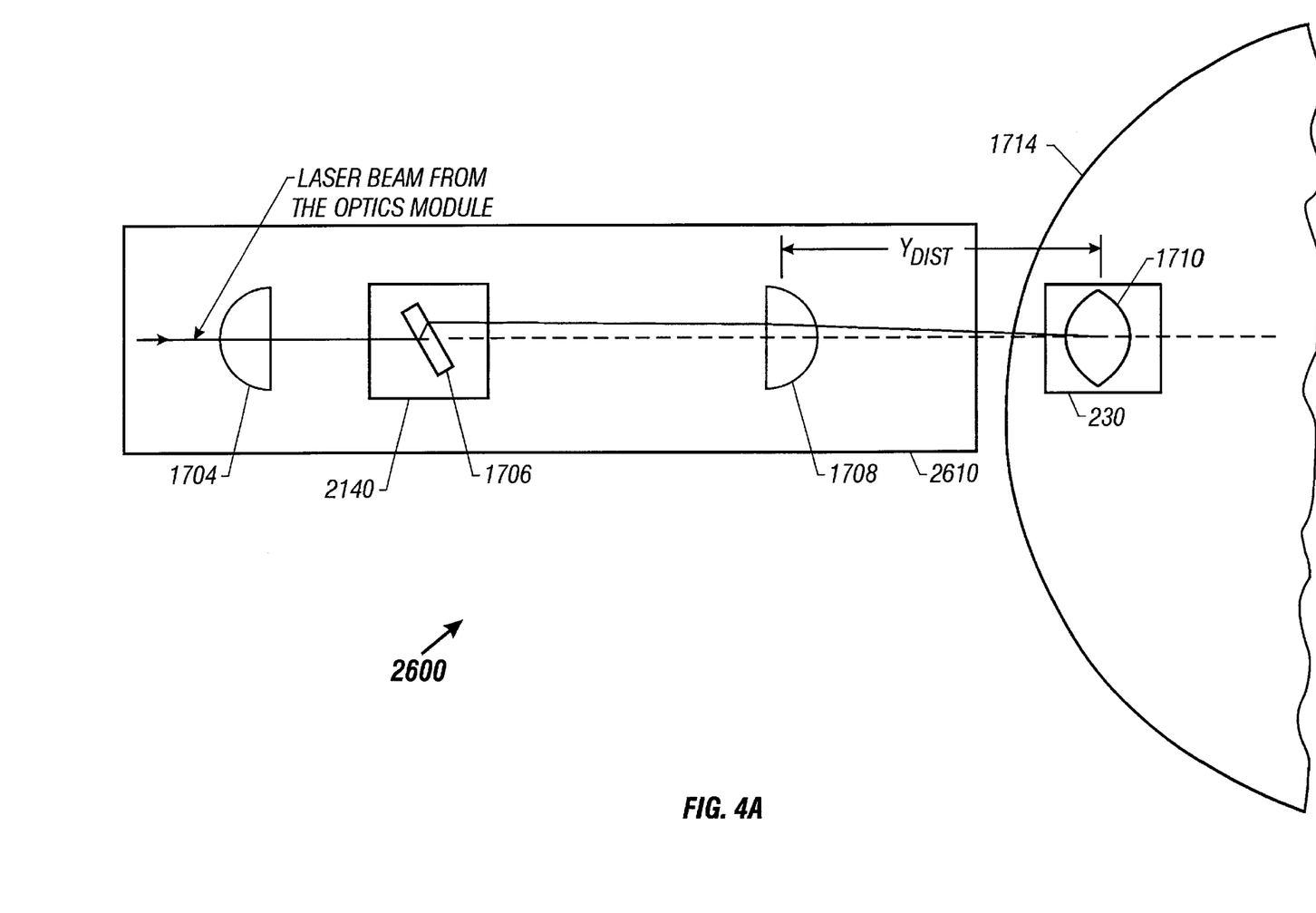
FIGS. 4A, 4B, 4C, and 4D illustrate a linear actuator and depict graphs showing the operation thereof for an optical disk drive according to an embodiment of the invention.
Figure 4B:
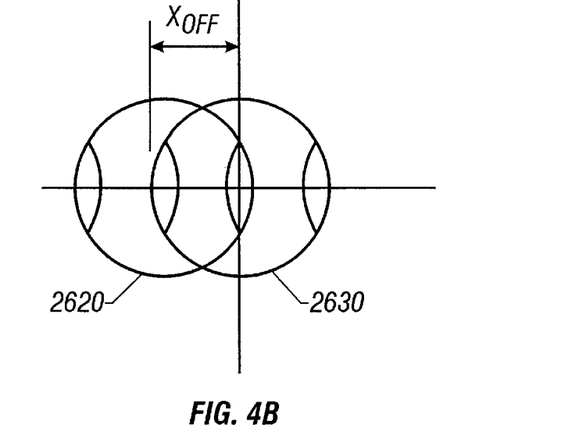
Figure 4C:
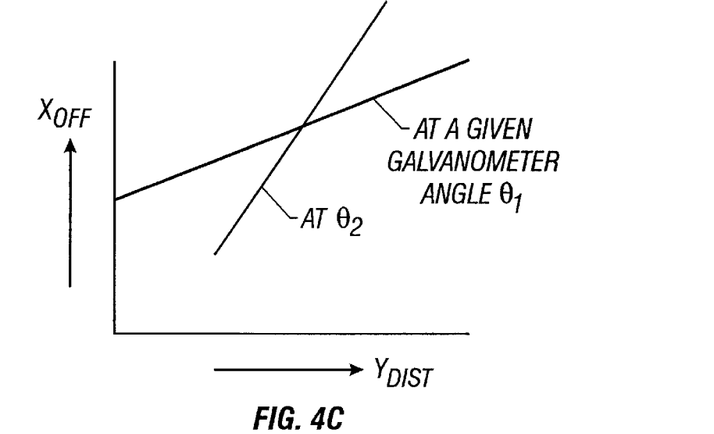

FIGS. 4A to 4C show a linear actuator system 2600. The optics module 1702 having the light source and detection module is not shown in FIG. 4A. In this embodiment, a distance $Y_{DIST}$ between the objective lens 1710 and the imaging lens 1708 is adjustable by the linear actuator 2610 rather than being fixed in the system as with a rotary actuator.

In operation, the linear actuator 2610 moves the flying head 230 along the optical axis of the optical train to coarsely position the objective lens 1710 over a recording surface of the disk 1714. A change in the distance $Y_{DIST}$ can result in a displacement of the beam on the objective lens and thereby on the disk surface. This displacement further causes the beam to shift from a desired position on the servo detector on the optics module ("beam walk-off"). The beam walk-off detected by the servo detector can be used to adjust the galvanometer or the linear actuator to restore the optimal focus of the beam.

Referring to FIGS. 4B and 4C, an offset $X_{OFF}$ between an ideal lobe 2630 and an actual lobe 2620 observed by the servo detector in the optics module varies linearly with the position of the flying head 230 on the disk surface 1712 and the angle/position of the transparent plate 1706 if the offset is uncompensated. By knowing the disk radius at which the flying head 230 is positioned and the position of the galvanometer 2140, a tracking servo control loop may be used to compensate for the offset $X_{OFF}$ for all disk radii and all beam angles θ.

Figure 4D:
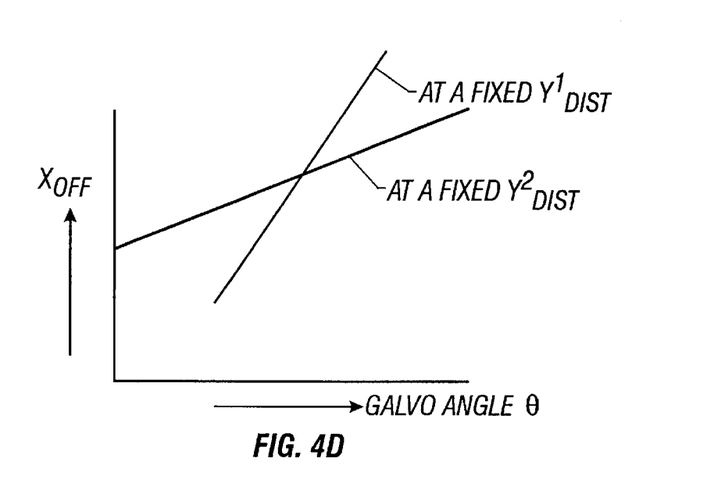

FIG. 4B illustrates the beam offset $X_{OFF}$ that is seen on the servo detector. The reflected beam from the flying head produces a well-aligned beam spot 2630 on the servo detector if the optical train is optimally aligned. Otherwise, the reflected beam will produce a beam spot 2620 that is offset from the ideal position 2630. This offset may be compensated by, for example, adjusting the distance $Y_{DIST}$ between the imaging lens 1708 and the objective lens 1710 for a fixed orientation of the galvanometer as shown in FIG. 4C. The dependence of the beam offset $X_{OFF}$ with respect to $Y_{DIST}$ may vary with the galvanometer angle. FIG. 4C shows that two different slopes can be achieved by fixing the angle of the galvanometer at two different angles $\theta_1$ and $\theta_2$. Alternatively, the offset may be compensated by adjusting the tilted angle of the galvanometer for a fixed distance as $Y_{DIST}$ as shown in FIG. 4D. The dependence of the beam offset $X_{OFF}$ with respect to the galvanometer angle may vary with $Y_{DIST}$. For example, two different slopes can be achieved by fixing $Y_{DIST}$ at two different values $Y^1_{DIST}$ and $Y^2_{DIST}$.

The optical medium used in the present invention includes usually one or more layers of a recording material coated on a substrate such as a disk. The recording material may be a magneto-optic material (typically made of a rare earth-transition metal compound such as TbFeCo), a phase-change material or other materials as disclosed in U.S. patent application Ser. No. 08/846,916. Data is imprinted on such a magneto-optic disk between tracks or grooves that are arranged in a spiral or concentric configuration. A segment of a data track can modulate the phase and intensity distribution of a read beam reflected from the optical disk. This modulation effectively superimposes the data onto the beam. The data detector senses the reflected signal to generate a tracking error signal which is further processed to extract the data and the tracking information of the read beam.

The near-field recording configuration based on the flying head usually has a high numerical aperture ("NA"). The working distance of the focusing optics is the distance from the final lens surface to the first physical surface of the media. For lenses with a high numerical aperture, this working distance becomes very small, as noted above, e.g., less than a wavelength. Thus, a flying optical head with a high NA lens cannot focus through any of the common optical substrate materials. One solution to this is to put the recording layer on or near the top surface of the substrate.

Figure 5:
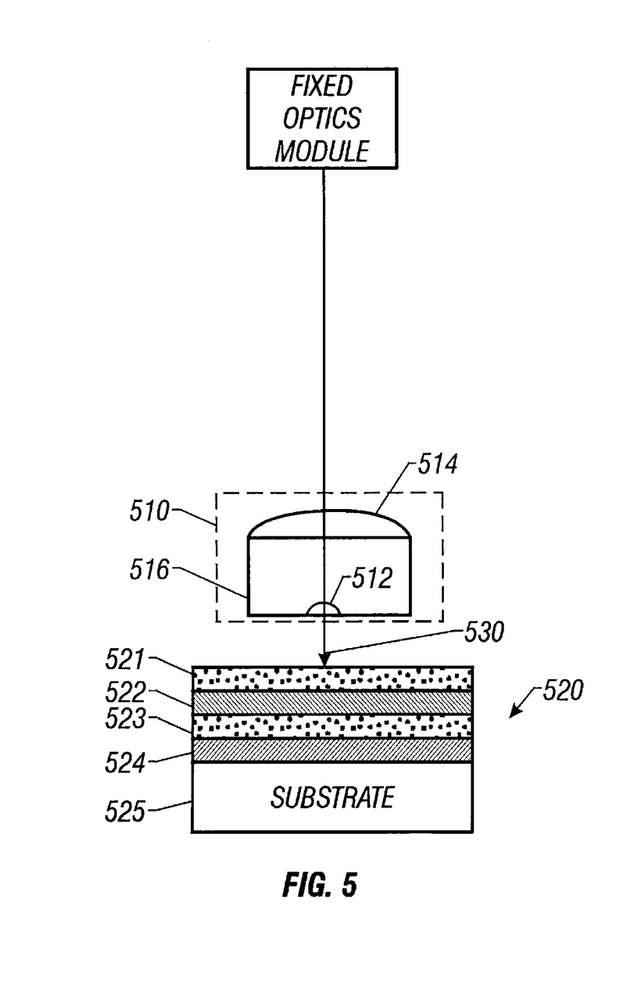
FIG. 5 is a diagram showing one embodiment of the first-surface-recording medium in a near-field configuration with respect to a flying head.

FIG. 5 shows one embodiment 520 of the multilayer structure of the invention. A reflective layer 524 (such as aluminum) is formed on a substrate 525, then a dielectric layer 523, an active recording layer 522 (e.g., an MO layer), and a top dielectric layer 521 are sequentially formed. A read/write beam 530 from the fixed optics module is focused by flying head 510 through an objective lens 514 and a near-field lens 512 onto the active layer 522.

The top dielectric layer 521 preferably is mechanically hard and durable and very smooth to accommodate the flying head 510. For example, SiN may be used for the top layer 521. Since the flying head 510 is very close to the MO layer 522 (i.e., less than one wavelength), a very small integrated MO bias coil can be included as part of the flying head 510 or slider 516 to achieve at a high switching frequency and linear recording density.

Typically, the material layer composition and thickness in the multilayer medium 520 can be configured to optimize several parameters for the best performance, including the medium sensitivity for recording, the magnetic field response, the signal-to-noise ratio ("SNR") of the readout signal, and the thermal properties of the medium. To increase recording sensitivity, the multilayer optical stack of materials is tuned to lower the reflectivity so as to allow more of the recording light to be absorbed in the active layer 522. If the reflectivity is reduced too much, however, very little light will be reflected from the medium 520 upon readout, resulting in a reduced SNR. For many common MO materials, a reflectivity in the range of 20% to 30% generally provides a good trade-off between write sensitivity and readout signal-to-noise ratio. The MO layer 522 should be thin enough and have a proper composition to react to a reasonably low magnetic bias field, typically in the range of 80 to 300 Oersteds, when heated by a laser beam. This allows a reasonable-sized bias coil with acceptable currents to create the magnetic field needed at the focused laser spot location in the active layer 522. The thermal properties of the medium 520 are very important for allowing high definition and small MO domains to be recorded. If too much lateral thermal diffusion in the plane of the MO media layer exists, the written domains will thermally expand or spread before the medium cools to below the Curie temperature to freeze the domain in place. If too much vertical thermal diffusion into the metal reflector layer exists, then the write sensitivity is affected and more laser power is needed to perform the write operation.

For near-field optical recording in the MO media, the recording layer composition and thicknesses have other significant requirements that can affect the storage system performance. In particular, the flying head 510 may have a varying flight height between the near field lens 512 and the medium 520 under typical operation conditions. For example, the variation in the flight height is dependent on the disk linear velocity (the changing radius of the head on the disk) and the air pressure and altitude. This variation in the flight height or air gap may produce a significant fluctuation in read and write performance since the light coupling between the flying head and the medium relies on the exponentially decaying evanescent light waves. In particular, the air gap variations can affect the performance of multilayered MO medium 520 since the air gap can be viewed as a varying thickness thin film on top of an MO layer structure that is already phase (or interference) matched. Therefore, it is important to design the media layers such that the media is least sensitive to flight height variations.

In general, the medium design depends on a number of parameters, including but not limited to, (1) the index of refraction of the near-field lens material (e.g., SIL lens material), (2) the NA of the objective lens, (3) the air gap distance, (4) the air gap variation, and (5) the composition and thicknesses of the multilayer MO media.

The dielectric index of refraction and the thickness of each layer between the near-field lens 512 and the substrate 525 of the medium 520 can play an important role in "flattening" the response of the MO media with respect to air gap changes. In practice, the refractive index is usually not a parameter which can be easily varied. However, it is possible to obtain a desired solution by combining different dielectric materials and adjusting their thicknesses.

Figure 6A:
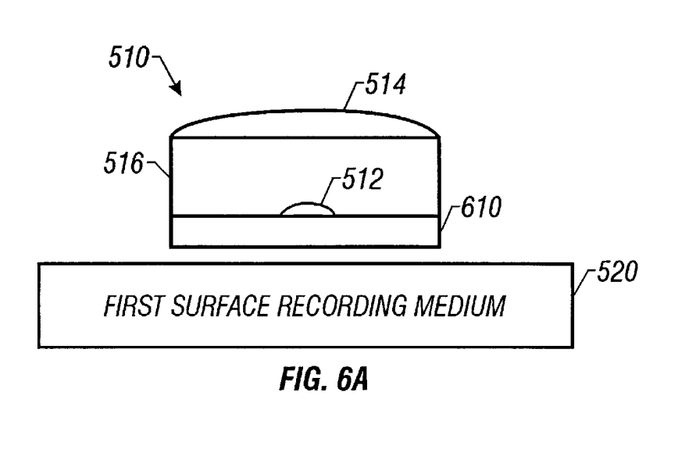
FIGS. 6A and 6B are diagrams showing two embodiments of the near-field flying head recording system have one or more transition dielectric layers between the near-field lens and the recording layer in the medium.

The performance of the near-field flying head storage system can be improved by implementing at least one transition dielectric layer on the bottom surface of the flying head. Alternatively, the transition layer 610 on the bottom of the flying head 510 may be only formed on the bottom of the near-field lens 512. FIG. 6A shows a transition dielectric layer 610 formed only on the bottom surface of the flying head 510. In the system shown in FIG. 6B, both the bottom surface of the flying head 510 and the top surface of the first surface recording medium 520 are coated with transition dielectric layers 610 and 620, respectively.

Figure 6B:
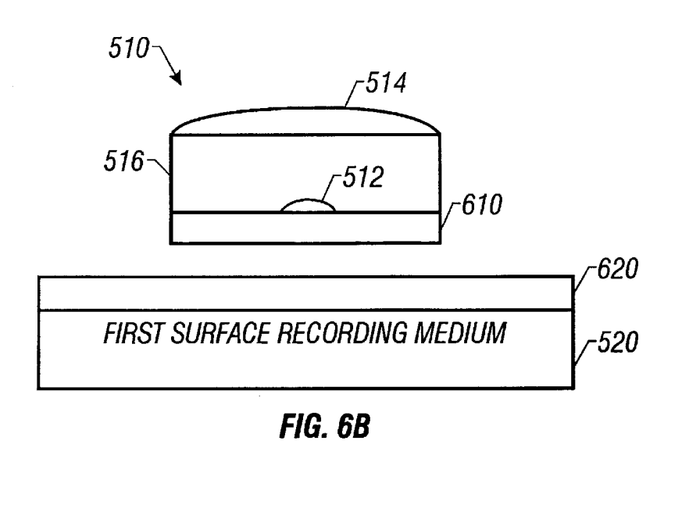

The transition dielectric layer ("TDL") can be used to enhance the optical and mechanical coupling of the near-field lens 512 and the medium 520 and to reduce the signal variation caused by the changing flying height. Preferably, the transition dielectric layer is transparent within the operating spectral range of the storage system and has an index of refraction $n_{TDL}$ between the index of the near-field lens 512 and that of the air gap. For a typical SIL with an index of about 2, the index of the transition dielectric layer is $1 < n_{TDL} < 2$. The transition dielectric layer 610 and/or 620 can be configured to improve the optical coupling between the flying head 510 and the recording medium 520.

Implementation of the transition dielectric layer 610 on the flying head 510 can result in a beneficial reduction in the optical thickness of one or more dielectric layers on top of the MO layer in the medium 520 in order to maintain the near-field configuration. Many existing MO disks are manufactured by forming dielectric and MO layers on grooved substrates where the grooves are used for optical tracking. Thick layers can often cause a non-conformal overall structure. Reduction in the thickness of the overlayers can reduce such groove filling and improve the accuracy in optical tracking.

The transition dielectric layer 610 may also be configured to provide tribological benefits. The transition dielectric layer 610 on the bottom surface of the flying head 510 may be mechanically softer than the near-field lens 512 and the slider 516 but may have a high wear resistance. This reduces the probability of damaging the flying head 510 and the recording medium 520 in the event that the flying head 510 hits the recording medium 520. In addition, by applying a thin layer of a lubricant over the transition dielectric layer, the friction between the flying head 510 and the medium 520 can be further reduced. Preferably, the transition dielectric layer 610 has an elastic modulus of larger than about 20 GPa and a hardness parameter of larger than about 5 GPa.

In general, the thickness of a transition dielectric layer (610 or 620) may be any value as long as the near-field configuration between the flying head 510 and the medium 520 is maintained. However, the preferred thickness range is between one-eighth and one-half of the effective wavelength within the transition dielectric layer, i.e., $\lambda/(8n_{TDL})$ and $\lambda/(2n_{TDL})$, where $\lambda$ is the wavelength of the read/write beam.

Materials suitable for the transition dielectric layer include the diamondlike carbon materials ("DLC"). Diamondlike carbon materials have been used to form protective layers on optical windows and surfaces of magnetic disks. See, for example, U.S. Pat. Nos. 5,510,186 to Shulzbach, 5,225,926 to Cuomo et al., and 5,397,644 to Yamashita, which are incorporated herein by reference. A DLC material can reduce the hardness of the flying head by making the air bearing surface more sponge-like. In addition, many lubricants stick to DLC well. DLC can be manufactured to have an index of refraction that is less than the SIL (e.g., n≈2) and greater than air (n=1). This makes a better transition for the light between the head and disk.

Figure 7:
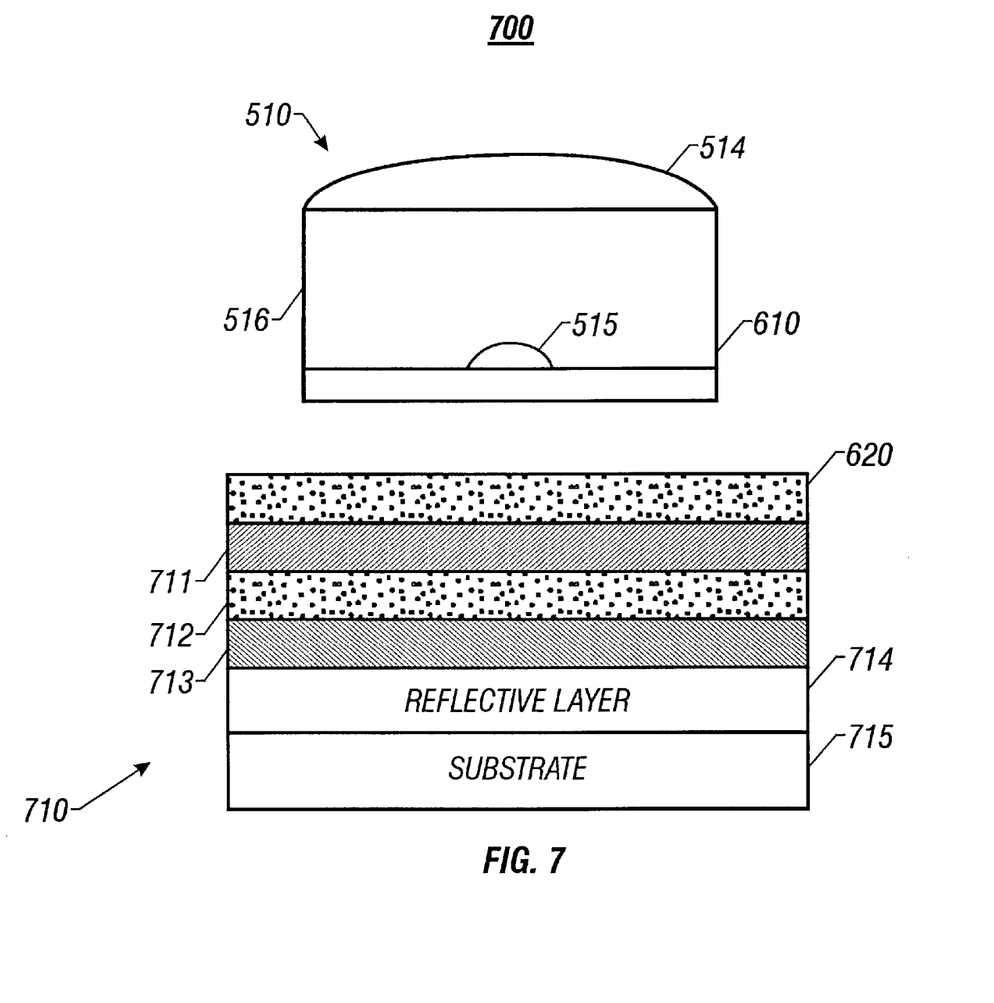
FIG. 7 is a diagram showing one embodiment of DLC-coated near-field flying head recording system.

FIG. 7 shows one implementation 700 of the configuration of FIG. 6B where both the bottom of the flying head 510 and the top of medium 710 are coated with DLC layers 610 and 620. The medium 710 comprises a top DLC layer 620, a first dielectric layer 711 under the DLC layer 620, an active recording layer 712 under the layer 711, a second dielectric layer 713 under the active layer 712, and a reflective layer 714. All layers are formed on a substrate 715.

The performance of the above near-field flying head recording systems may be modeled by using a diffraction model in conjunction with a thin-film simulation package. See, Mansuripur, "Certain Computational Aspects of Vector Diffraction Problems", J. Opt. Soc. of Am., Vol. 6, No. 5 (June 1989). The diffraction model (termed "DIFFRACT") includes a Fourier decomposition of a given amplitude distribution in space into plane waves and a subsequent superposition of these plane waves, after propagation through various selected optical components. DIFFRACT is run in a quasi-vector mode. Bending and mixing of the components of polarization is performed, to a certain extent. DIFFRACT handles the propagation of a linearly polarized collimated Gaussian beam of wavelength $\lambda$ and a specified 1/e point. The beam is incident on an objective lens with an numerical aperture NA and a focal length FL. The beam is focused in a medium of incidence that has a refractive index $n_{sn}$. The focal point of the objective lens is assumed to coincide with the interface between the flying head and air. The propagation of the beam outside the flying head near-field lens is handled by a thin film program known as "MULTILAYER". See Mansuripur, M., "Analysis of Multilayer Thin-Film Structures Containing Magneto-Optic and Anisotropic Media at Oblique Incidence Using 2×2 Matrices," J. Appl. Phys., Vol. 67, No. 10 (May 1990). MULTILAYER calculates the reflection from the multilayer stack including the air gap and media structure.

Figure 8:
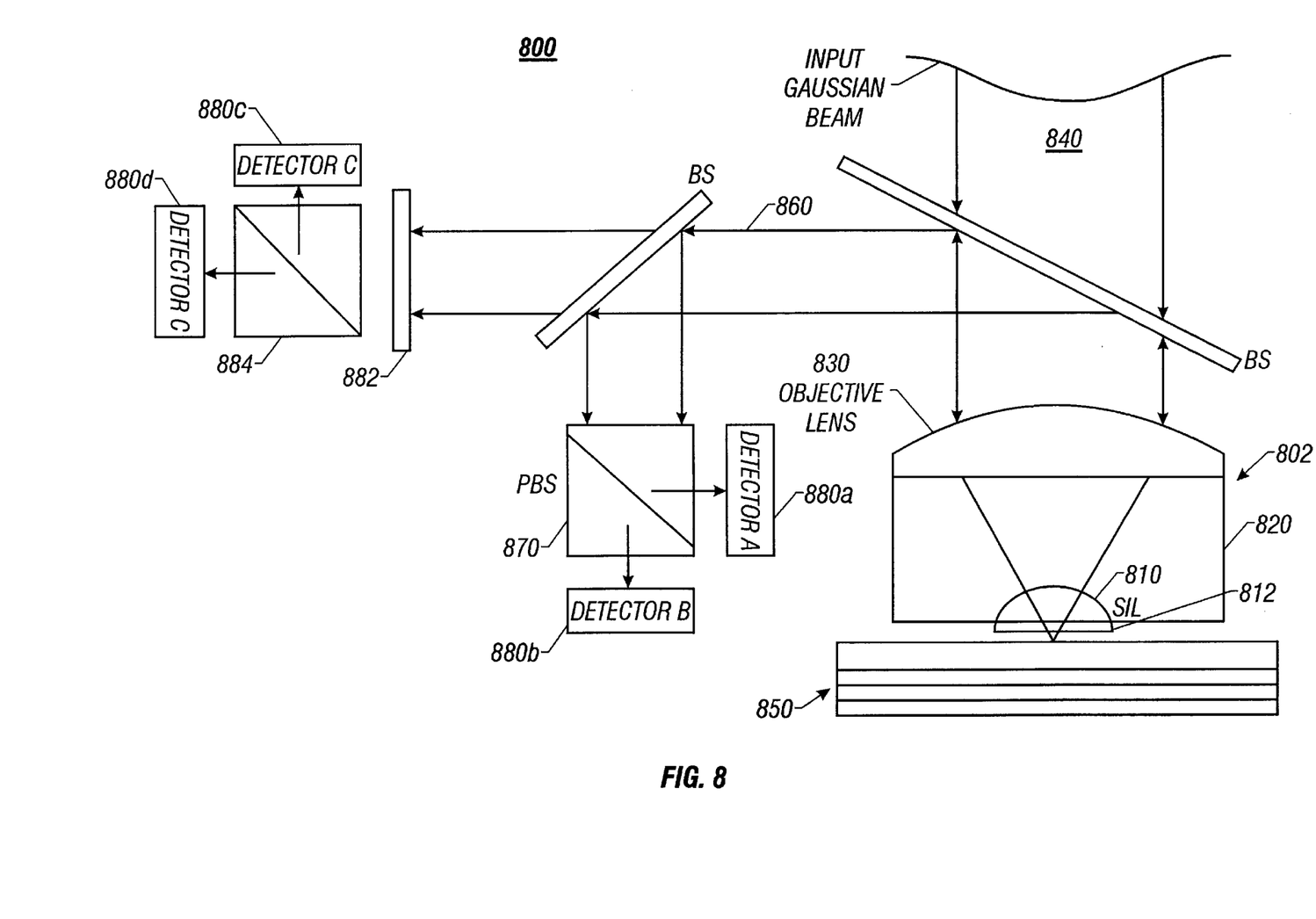
FIG. 8 is a diagram showing a near-field optical system that is used to simulate the operation of the flying head in a near-field configuration.

FIG. 8 illustrates a system 800 for modeling. Although a SIL 810 is shown, a near-field flying head employing a GRIN lens is also applicable. Flying head 802 has an objective lens 830, a slider 820 and the SIL 810. A transition layer 812 made of DLC is coated under the SIL 810. A linearly polarized input beam 840 is focused by the flying head 802 to a medium 850 and the reflected beam 860 is collected by the objective lens 830 and is directed to a polarizing beam splitter ("PBS") 870 which directs the reflected beam into two detectors 808a and 808b. The sum of signals from detectors 808a and 808b is proportional to the reflectivity of the medium 850 while the difference of the signals from detectors 808a and 808b is proportional to the MO signal indicative of the recorded data. A portion of the reflected beam 830 is also directed to a quarter wave plate 882 with its fast axis along the axis of incidence polarization. Another polarizing beam splitter 884 and two differential detectors 880c and 880d are used to measure the ellipticity in the MO signal.

The parameters for the system 800 shown in FIG. 8 are listed below:

Incident Beam
  Linearly polarized
  Gaussian beam diameter (1/e) 0.813 mm
  Wavelength $\lambda$=685 nm
Objective Lens
  Radius=0.8 mm
  NA=0.65
  Focal Length=1.23 mm
SIL material: n=2.15, k=0
Optical properties of the layers at $\lambda$=685 nm
  SiN: n=2.07, k=0.05
  SiO$_2$: n=1.45, k=0
  DLC: n=1.85, k=0
  MO: n+=3.5368, k+=3.4874, n−=3.4346, k−=3.4148
  Al: n=1.5618, k=9.0725
  Air: n=1 where n is the index of refraction, k is the index of absorption, and "±" indicates right- and left-handed circular polarizations.

The preferred but not necessarily required conditions for maximum coupling efficiency and optimum read/write performance can be summarized by the following:

(A) Reflectivity (A+B) less than 30% (this is useful for good media sensitivity and low feedback into the laser, hence lower noise).

(B) MO signal, i.e., (A−B), better than MO media with 20% reflectivity and 0.8 degrees of Kerr rotation [(A−B)=Reflectivity (%)×Kerr Rotation$_{in\ radians}$×2×Gain]. For example, when Gain=100, A−B=55.82.

(C) Relative change of reflectivity less than 5% over an air gap range of 75 to 125 nm, i.e. $(R_{@125}-R_{@75})/R_{@100}<5\%$.

(E) Relative change of MO signal less than 5% over an air gap range of 75 to 125 nm i.e. $(MO_{@125}-MO_{@75})/MO_{@100}<5\%$ (F) Good frequency response over an air gap range of 75 to 125 nm.

(G) Acceptable tolerance of thin film thickness variation.

In addition, the following guidelines and conditions have been used in modeling:

(A) Aluminum reflecting layer of thickness greater than 40 nm (i.e., optically thick);

(B) Air gap varies from 75 to 125 nm;

(C) Thin MO layer, i.e., less than 30 nm, is used to increase the magnetic field sensitivity;

(D) DLC is used as a final "capping" layer to reduce required recording laser power and layer durability; and (E) dielectrics different from the transition DLC layer (e.g., SiO$_2$ and SiN) can be used to construct other dielectric layers in the medium.

The performance of the near-field storage system 700 has been evaluated by using the following specific combination:

Flying head 510
  Near-field lens 512: SIL, n=2.15;
  DLC coating 610: 100 nm, n=1.85.
Medium 710
  Top DLC layer 620: 80 nm, n=1.85;
  First dielectric layer 711: SiO$_2$, 30 nm, n=1.15;
  MO layer 712: 20 nm;
  Second dielectric layer 713: SiN$_2$, 30 nm;
  Reflective layer 714: Aluminum, 50 nm.

Figure 9A:
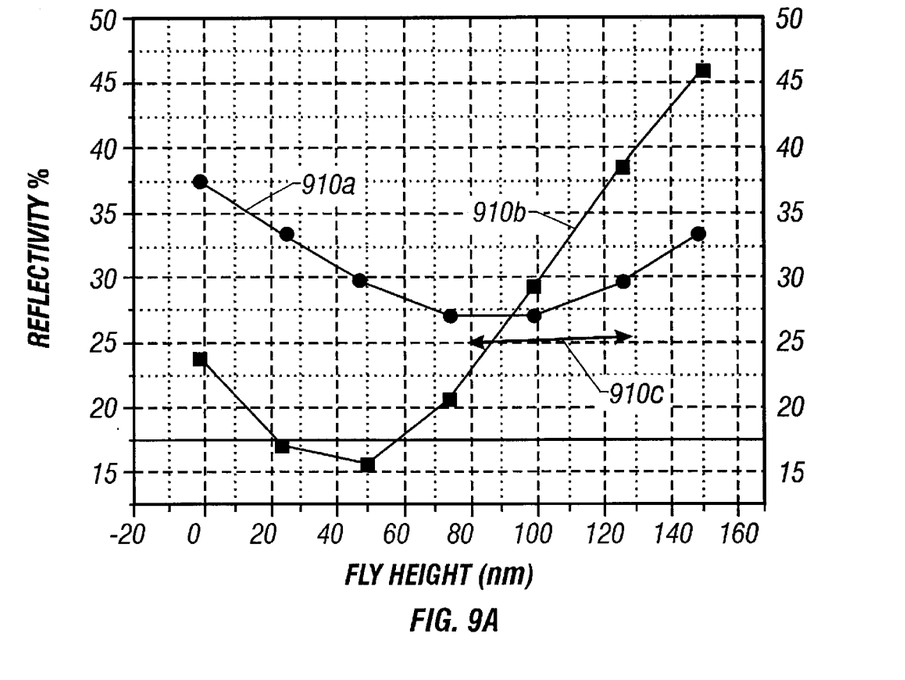
FIG. 9A is a chart showing the simulated reflectivity of the DLC-coated flying head-medium assembly as a function of the flying height.
Figure 9B:
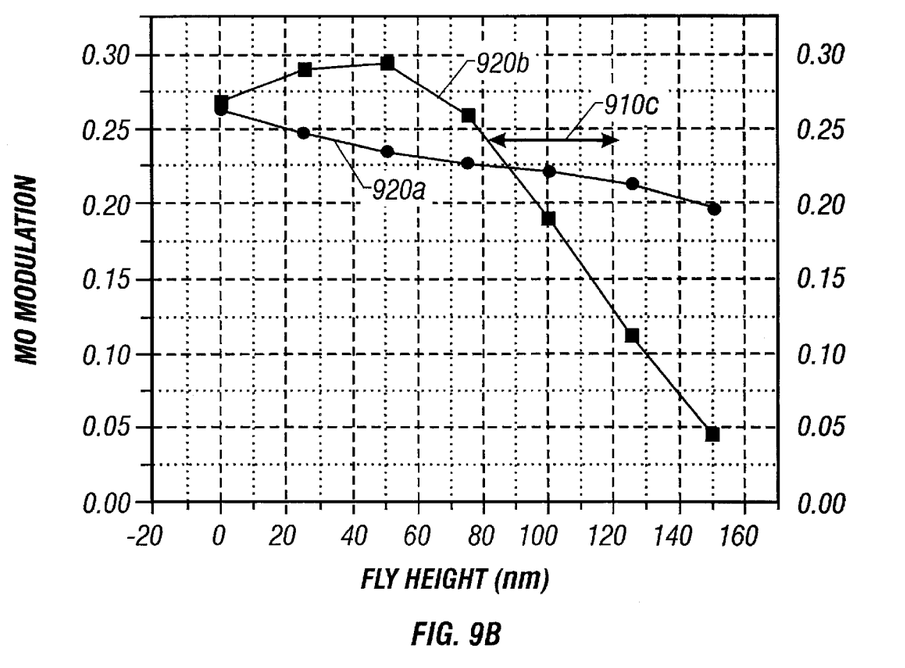
FIG. 9B is a chart showing the simulated magneto-optic modulation signal of the DLC-coated flying head-medium assembly as a function of the flying height.

FIG. 9A and 9B are simulation results based on the modeling system 800 of FIG. 8 to show the reflectivity of the flying head-medium assembly and the MO modulation signal as a function of the flying height of the flying head over the medium. In both figures, solid dots represent the response of the flying head-medium assembly with the DLC layers 610 and 620. To show the effects of the DLC layers, simulation results of a flying head-medium assembly without the DLC layers are also presented with squares for comparison. The medium without the top DLC layer 620 has the following structure:

SiN(120)/MO(20)/SiN(20)/Al(50)/Substrate.

In FIG. 9A, the reflectivity of the DLC-coated system represented by the curve 910a is much less sensitive to the variation in the flying height than the non-DLC-coated system (curve 910b). At flying heights above 50 nm, the reflectivity of the non-DLC-coated system increases approximately 0.35% per nm while the reflectivity of the DLC-coated system varies less than 0.14% per nm. The simulation further indicates that the reflectivity of the DLC-coated system near 100 nm in flying height within a range of about 50 nm (indicated by line 910c) is near the bottom of the curve 910a. Therefore, the DLC-coated system may be preferably operated at a flying height of near 100 nm to achieve uniformity in the signal response.

The MO modulation signals 920a and 920b in FIG. 9B for the DLC-coated and non-DLC-coated systems show similar results. At a flying height near 100 nm, the MO modulation signal 902b for the non-DLC-coated system changes at a rate ($\sim 26 \times 10^{-4}$/nm) about 10 times larger than that of the DLC-coated system. In general, a DLC layer between 20–100 nm may be coated on the bottom of the flying head.

Although the present invention has been described in detail with reference to the preferred embodiments, one ordinarily skilled in the art to which this invention pertains will appreciate that various modifications and enhancements may be made without departing from the spirit and scope of the following claims.

What is claimed is:

1. An optical system in a near-field configuration, comprising:
    an objective lens located to receive an optical beam of a selected wavelength and to output a modified optical beam;
    a near-field lens disposed relative to said objective lens at a prespecified position to receive the modified optical beam from said objective lens;
    an optical medium disposed relative to said near-field lens at a distance smaller than said selected wavelength on an opposite side of said near-field lens from said objective lens; and
    a first transition layer formed on a surface of said near-field lens between said near-field lens and said optical medium, said first transition layer formed from a dielectric material different from a material of said near-field lens and having a refractive index smaller than a refractive index of said near-field lens to enhance at least optical coupling between said near-field lens and said optical medium.

2. A system as in claim 1, wherein said objective lens and said near-field lens are spaced from each other with a substantially constant distance without a servo control.

3. A system as in claim 2, wherein said first transition layer is configured to enhance mechanical coupling between said near-field lens and said optical medium.

4. A system as in claim 2, further comprising a second transition layer formed on a surface of said optical medium between said near-field lens and said optical medium, said second transition layer being made of the same dielectric material as said first transition layer.

5. A system as in claim 1, wherein said first transition layer has a thickness between one-eighth and one-half of an effective wavelength of said selected wavelength within said first transition layer.

6. A system as in claim 1, wherein said first transition layer has an elastic modulus of larger than about 20 GPa.

7. A system as in claim 1, wherein said first transition layer has a hardness of larger than about 5 GPa.

8. A system as in claim 1, wherein said first transition layer is formed of a diamondlike carbon material.

9. A system as in claim 1, wherein said optical medium comprises a substrate, a reflective layer formed on said substrate, a first dielectric layer formed on said reflective layer, an active recording layer formed on said first dielectric layer, a second dielectric layer formed on said recording layer, and a second transition layer formed on said second dielectric layer, wherein said second transition layer is configured to have an index of refraction smaller than a material of said near-field lens and is disposed adjacent to said first transition layer on said near-field lens.

10. A system as in claim 9, wherein said first and second transition layers effectively reduce the total thickness of said reflective layer, said first dielectric layer, said active recording layer, and said dielectric layer on said substrate in order to maintain the spacing between said near-field lens and said active recording layer less than said selected wavelength.

11. A system as in claim 9, wherein said first and second transition layers are made of a diamondlike carbon material.

12. A system as in claim 11, wherein:
    said reflective layer includes aluminum;
    said first dielectric layer includes silicon nitride;
    said active recording layer includes a magneto-optic material; and
    said second dielectric layer includes an oxide of silicon.

13. An optical system in a near-field configuration, comprising:
    a first lens;
    a second lens disposed relative to said first lens to form an optical path from said first lens to said second lens; and
    a transition layer formed on a surface of said second lens that is on an opposite side of said second lens from said first lens, said transition layer having an index of refraction smaller than a material of said second lens, wherein said first lens, said second lens, and said transition layer operate in combination to receive and modify an optical beam to transfer energy of said optical beam by evanescent waves to a plane spaced from said second lens less than one wavelength of said optical beam.

14. A system as in claim 13, wherein said transition layer has a thickness between one-eighth and one-half of an effective wavelength of said optical beam within said transition layer.

15. A system as in claim 13, wherein said transition layer has an elastic modulus of larger than 20 GPa.

16. A system as in claim 13, wherein said transition layer has a hardness of larger than 5 GPa.

17. A system as in claim 13, wherein said transition layer is formed of a diamondlike carbon material.

18. A system as in claim 13, further comprising an optical medium configured to have a recording layer and disposed relative to said second lens so that said recording layer is near or at the plane.

19. A system as in claim 18, wherein said optical medium is a disk operable to spin and to effect an air bearing layer between said second lens and said optical medium to support said second lens.

20. A system as in claim 19, further comprising a second transition layer formed on top of said optical medium over said recording layer, said second transition layer being made of the same dielectric material as said first transition layer.

21. A system as in claim 20, wherein said first and second transition layers are configured to enhance both optical coupling and mechanical coupling between said second lens and said optical medium.

22. A system as in claim 20, wherein said optical medium comprises a substrate, a reflective layer formed on said substrate, a first dielectric layer formed on said reflective layer, said recording layer formed on said first dielectric layer, a second dielectric layer formed on said recording layer, and said second transition layer formed on said second dielectric layer.

23. A system as in claim 22, wherein said first and second transition layers effectively reduce the total thickness of said reflective layer, said first dielectric layer, said recording layer, and said dielectric layer on said substrate in order to maintain the spacing between said second lens and said recording layer less than the wavelength of said optical beam.

24. A method for effecting near-field optical data recording and retrieving, comprising:

using an objective lens to receive and modify an optical beam of a selected wavelength to produce a first modified beam;

modifying said first modified beam to produce a second modified beam by using a near-field lens located relative to said objective lens;

coupling energy of said second modified beam to an optical medium spaced from said near-field lens with a distance smaller than said selected wavelength by evanescent wave coupling to exchange information between said second modified beam and said optical medium; and using a first transition dielectric layer formed on a surface of said near-field lens between said near-field lens and said optical medium to enhance at least optical coupling between said near-field lens and said optical medium, wherein said first transition dielectric layer has a refractive index smaller than a refractive index of said near-field lens.

25. A method as in claim 24, further comprising maintaining a spacing between said objective lens and said near-field lens substantially constant without a servo control.

26. A method as in claim 24, further comprising forming a second transition dielectric layer on said optical medium adjacent to said first transition dielectric layer.

27. A method as in claim 26, wherein:

said optical medium comprises a substrate, a reflective layer formed on said substrate, a first dielectric layer formed on said reflective layer, an active recording layer formed on said first dielectric layer, and a second dielectric layer formed on said recording layer; and said second transition dielectric layer is formed on said second dielectric layer and is configured to have an index of refraction smaller than a material of said near-field lens.

28. An optical storage device for writing data to or retrieving data from a storage medium, comprising an optical head to produce a numerical aperture greater than unity, said optical head including:

an objective lens and a solid immersion lens to define an optical path, said solid immersion lens having a spherical surface and an opposing flat surface which couples optical energy to and from the storage medium, and a dielectric transition layer of a thickness between one-eighth and one-half of an effective wavelength of coupled optical energy within said transition layer, having a refractive index less than a refractive index of said solid immersion lens, formed on said flat surface to enhance optical coupling between said solid immersion lens and the storage medium and to reduce a signal variation with respect to a variation in a spacing between said solid immersion lens and the storage medium.

29. A device as in claim 28, wherein said transition layer has an elastic modulus of larger than 20 GPa.

30. A device as in claim 28, wherein said transition dielectric layer has a hardness greater than 5 GPa.

31. A method for configuring and operating an optical storage system to reduce a variation in an optical signal reflected from a storage medium when a spacing between an optical head and the storage medium changes in a near-field configuration, comprising:

providing a solid immersion lens having a spherical surface and an opposing flat surface in the optical head to couple optical energy to and from the storage medium through the flat surface;

forming a dielectric transition layer on the flat surface to couple the optical energy between the solid immersion lens and the storage medium, wherein the dielectric transition layer has a thickness between one-eighth and one-half of an effective wavelength of coupled optical energy within said transition layer and a refractive index less than a refractive index of said solid immersion lens; and maintaining the flat surface of the solid immersion lens spaced from the storage medium by less than one wavelength.

32. The method as in claim 31, further comprising maintaining the flat surface of the solid immersion lens spaced from the storage medium at a spacing greater than a first spacing but smaller than a second spacing wherein a reflected optical signal from the storage medium has a minimum value.

33. The method as in claim 31, further comprising structuring the storage medium to include:

a metal reflective layer having a thickness greater than 40 nm;

a first dielectric layer over said metal reflective layer and formed of one of silicon dioxide and silicon nitride;

a magneto-optic layer over said first dielectric layer and having a thickness less than 30 nm;

a second dielectric layer over said magneto-optic layer and formed of one of silicon dioxide and silicon nitride; and a top dielectric transition layer formed over said second dielectric layer and formed of a same material of said dielectric transition layer on the flat surface of the solid immersion lens which is different from silicon dioxide and silicon nitride.

34. A method as in claim 33, further comprising controlling the variation of the air gap between the top dielectric transition layer on the storage medium and the dielectric transition layer on the solid immersion lens within a range approximately between 75 nm and 125 nm.

35. An optical disk drive, comprising:

an optical disk to store data, having a metal reflective layer having a thickness greater than 40 nm, a first dielectric layer over said metal reflective layer, a magneto-optic layer over said first dielectric layer and having a thickness less than 30 nm, a second dielectric layer over said magneto-optic layer, and a top dielectric transition layer formed over said second dielectric layer, wherein each dielectric layer is formed of one of silicon dioxide and silicon nitride;

an optical head to produce a numerical aperture greater than unity, said optical head including an objective lens and a solid immersion lens to define an optical path, said solid immersion lens having a spherical surface and an opposing flat surface which couples optical energy to and from the storage medium, and a dielectric transition layer formed on said flat surface to enhance optical coupling between said solid immersion lens and said optical disk and to reduce a signal variation with respect to a variation in a spacing between said solid immersion lens and said optical disk, wherein said dielectric transition layer and said top dielectric transition layer are formed of and formed of a material different from said first and second dielectric layers and have a refractive index less than a refractive index of said solid immersion lens; and an actuator to place said optical head over said optical disk during operation by a spacing less than one wavelength.

36. An optical disk drive as in claim 35, wherein said dielectric transition layer has a thickness between one-eighth and one-half of an effective wavelength of said selected wavelength within said first transition layer.

* * * * *